United States Patent
Zimmer

(10) Patent No.: US 6,851,157 B2
(45) Date of Patent: Feb. 8, 2005

(54) WIPER SYSTEM, ESPECIALLY FOR A MOTOR VEHICLE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 10/030,935

(22) PCT Filed: Mar. 10, 2001

(86) PCT No.: PCT/DE01/00920

§ 371 (c)(1),
(2), (4) Date: Jan. 14, 2002

(87) PCT Pub. No.: WO01/87678

PCT Pub. Date: Nov. 22, 2001

(65) Prior Publication Data

US 2003/0005538 A1 Jan. 9, 2003

(30) Foreign Application Priority Data

May 17, 2000 (DE) .......................... 100 24 255

(51) Int. Cl.⁷ ............... B60S 1/06; B60S 1/16
(52) U.S. Cl. ............... 15/250.13; 318/DIG. 2; 318/445; 318/483
(58) Field of Search ............ 15/250.12, 250.13; 318/461, 443, DIG. 2, 280, 286, 445, 483

(56) References Cited

U.S. PATENT DOCUMENTS

| | | | | |
|---|---|---|---|---|
| 4,866,357 A | * | 9/1989 | Miller et al. ................. | 318/443 |
| 4,934,014 A | * | 6/1990 | Yamamoto ................ | 15/250.13 |
| 5,119,002 A | | 6/1992 | Kato et al. ................... | 318/444 |
| 5,142,728 A | * | 9/1992 | Yamamoto et al. ....... | 15/250.13 |
| 5,287,585 A | * | 2/1994 | Yamamoto et al. ....... | 15/250.13 |
| 5,333,351 A | * | 8/1994 | Sato ......................... | 15/250.13 |
| 6,140,785 A | * | 10/2000 | Hogler ........................ | 318/282 |
| 6,249,098 B1 | * | 6/2001 | Miyazaki et al. ............ | 318/280 |
| 6,281,649 B1 | * | 8/2001 | Ouellette et al. ........... | 318/443 |
| 6,388,411 B1 | * | 5/2002 | Ostrowski ................... | 318/461 |

FOREIGN PATENT DOCUMENTS

| | | |
|---|---|---|
| DE | 196 34 559 A | 3/1998 |
| DE | 198 18 173 A1 | 11/1999 |
| WO | 98/08717 | * 3/1998 |
| WO | 99/15380 | * 4/1999 |

* cited by examiner

Primary Examiner—Gary K. Graham
(74) Attorney, Agent, or Firm—Michael J. Striker

(57) ABSTRACT

Wiper system, in particular for a motor vehicle, having at least one wiper (12) supported in a fashion that allows it to swing between two end positions, that can be driven by a—particularly electronically—reversible electric motor (20) so that the swing angle (16) enclosed by the two end positions of the wiper (12) is determined by reversing positions (38, 40) of the electric motor, wherein at least one reversing position (38, 40) of the electric motor (20) can be controlled as a function of vehicle speed.

9 Claims, 4 Drawing Sheets

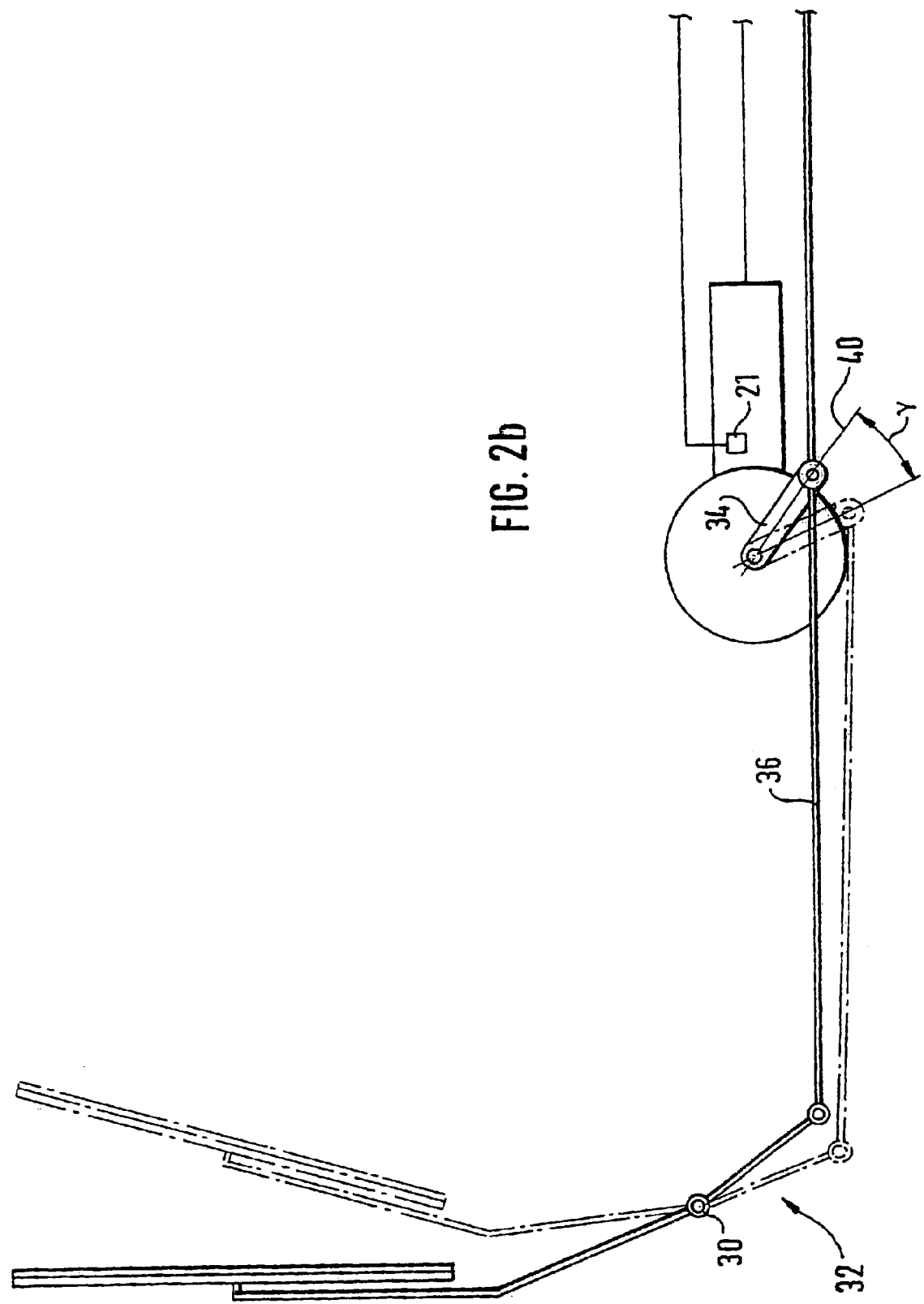

WIPER SYSTEM, ESPECIALLY FOR A MOTOR VEHICLE

BACKGROUND OF THE INVENTION

The invention concerns a wiper system, in particular for a motor vehicle, according to the general class of the independent claim. The objective of this wiper system is to achieve a course of wiping that is as uniform as possible.

Wiper systems for motor vehicles having controllable wipers have already been made known, e.g., in DE 198 18 173 A1, in which the speed of the wipers is controlled as a function of position and vehicle speed.

SUMMARY OF THE INVENTION

The wiper system according to the invention has the advantage that the reversal positions or end positions of the wiper can be kept constant independent of the vehicle speed by changing the reversing position of the wiper motor. The elasticities present in the linkage of the wiper system can be compensated for in this fashion by changing the reversal points of the wiper motor.

The specified wipe pattern can be maintained exactly without an external sensor, such as a wind speed indicator, because the wind velocity is nearly proportional to the vehicle speed, particularly at the relevant high velocities.

Advantageous further developments and improvements of the features indicated in the primary claim result from the measures listed in the subclaims.

It is particularly advantageous when the wiper system comprises a memory device in which the reversing positions are stored, e.g., in the form of a table, as a function of the speed of the motor vehicle. In this fashion, the reversing positions can be implemented easily and quickly in the wiper system.

It is also advantageous when the wiper system comprises a central processor that determines the reversing positions of the electric motor using the vehicle speed so that more complex algorithms can also be used to control the reversing positions as a function of the vehicle speed.

Furthermore, it is advantageous when the wiper system comprises an emergency operation step in which the reversing positions are permanently specified that is triggered when vehicle speed information is missing. If defects occur in the tachometer or a corresponding connecting lead, a sufficiently large wipe pattern can always be guaranteed in this fashion.

Since the aerodynamic effects work in opposite directions in conventional wiper systems having wiping angles in the range of 90° between the two end positions, it is particularly advantageous when the reversing positions have the same difference, independent of vehicle speed.

It is furthermore advantageous when, if the difference of the reversing positions remains the same, they can be shifted as a function of vehicle speed. Resources can be spared in this fashion while simultaneously ensuring a consistently large wipe pattern, even at high velocities.

It is also advantageous when the wiper system comprises a rain sensor, because the wiper system can then be controlled in this fashion as a function of a humidity signal, so that optimal cleaning results can always be achieved.

BRIEF DESCRIPTION OF THE DRAWINGS

An exemplary embodiment of the invention is shown in the drawings and explained in greater detail in the description hereinafter.

FIGS. 2a and 2b are schematic representations of one side of a linkage of a wiper system according to the invention.

DESCRIPTION OF THE PREFERRED EMBODIMENTS

Figure 1A:
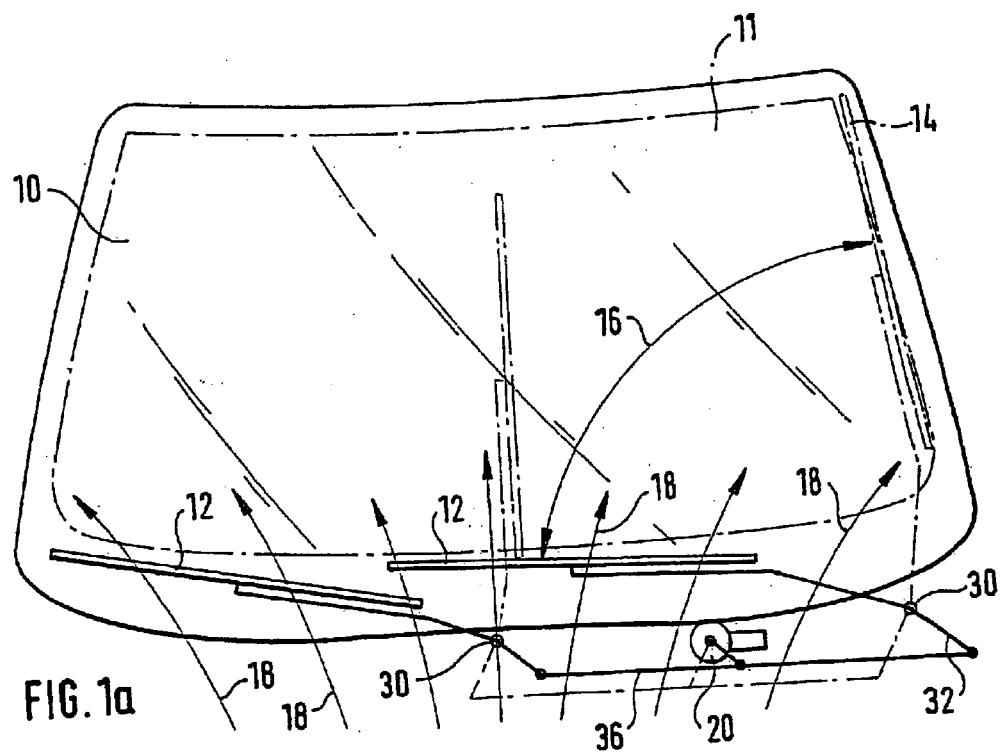
FIGS. 1a and 1b show a schematic representation of a windshield of a motor vehicle having two wipers.

A windshield 10 having the prescribed area of vision 11 and two wipers 12 located in the lower end position is shown in FIG. 1a. During operation, the wipers 12 swing between the bottom end position and the top end position 14 around the wiper axles 30. The wipers 12 enclose a swing angle (16) between top and bottom end position.

During operation, an air stream occurs over the windshield 10 as a result of the motion of the vehicle. The air stream is indicated by the flow arrows 18 in the diagram. As a result of this air stream, the wipers 12 are pushed further and further upward at higher vehicle speeds. The bottom end position of the wipers 12 is therefore shifted upward at higher vehicle speeds due to the elasticities in the wiper system.

Figure 1B:
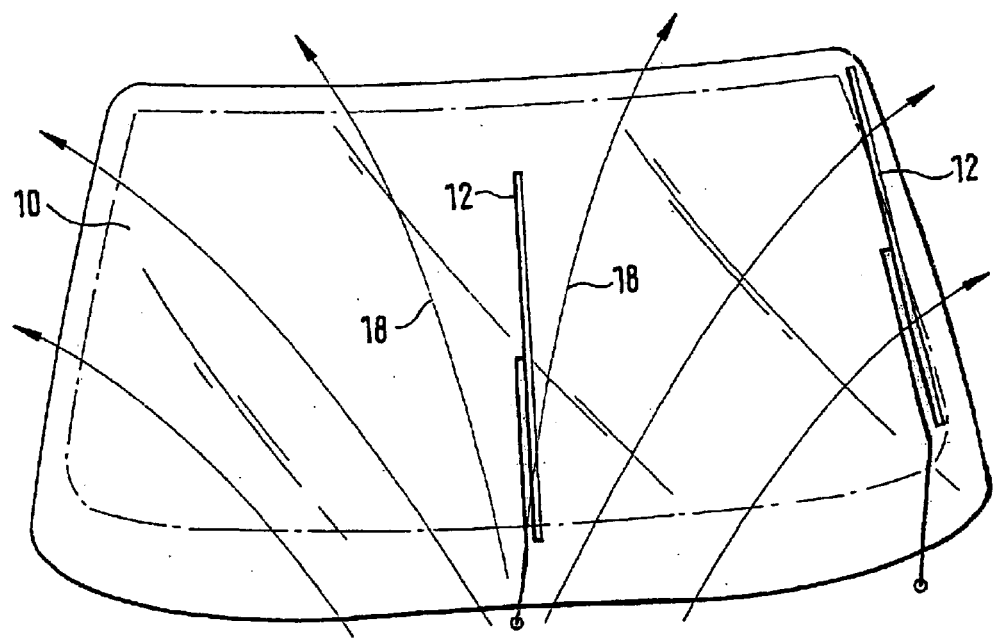

A windshield 10 having two wipers 12 is also shown in FIG. 1b. The two wipers 12 are located in the top end position. The air stream on the windshield 10 is indicated by flow arrows 18 in this drawing as well.

Due to the shape of the windshield 10, the wipers 12 are pushed outward by the air stream at higher vehicle speeds. The top end position of the wipers 12 is therefore pushed outward even further at higher vehicle speeds.

Figure 2A:
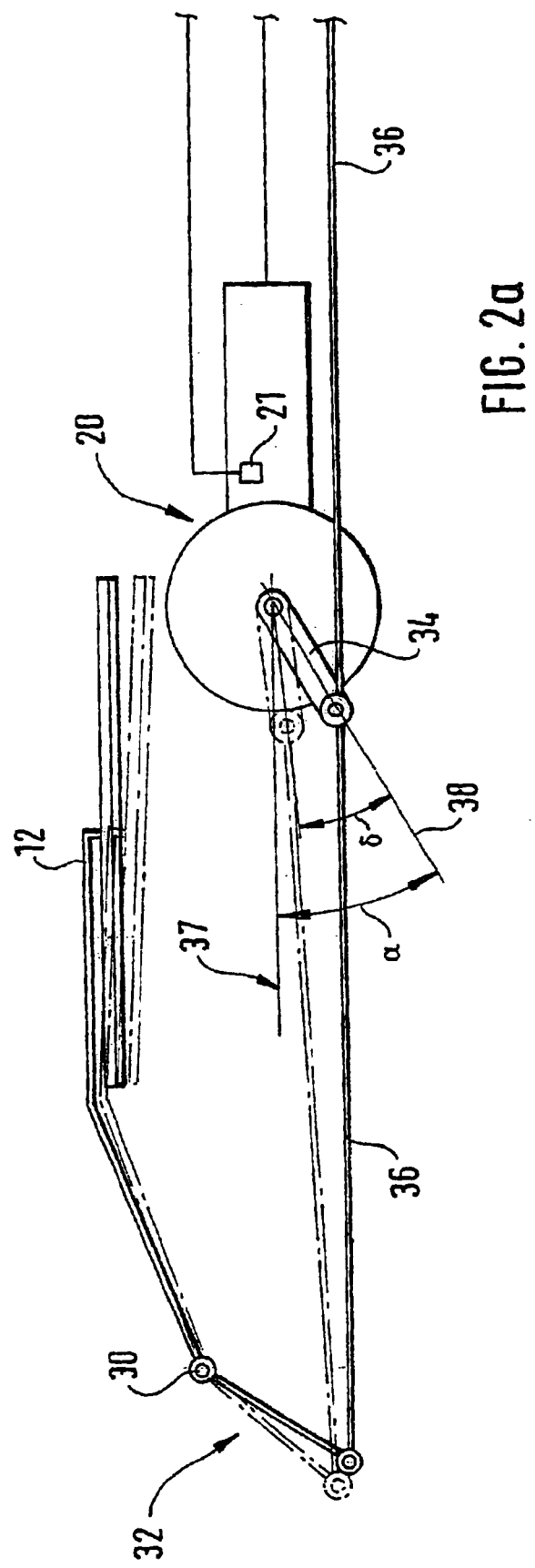

FIGS. 2a and 2b show a schematic representation of a linkage of a wiper system according to the invention.

One side of a wiper linkage is shown in the bottom end position in FIG. 2a. The wiper axle 30, to which the wiper 12 is attached, is moved by the oscillating cranks 32, which are driven by the wiper motor 20 via the cranks 34 and the couple rods 36. Since the wiper motor 20 is designed as a reversing motor, it can reverse in any position, that is, its direction of rotation and, therefore, the wiping direction, can change at any random point.

The solid lines show the wiper linkage in the bottom end position of the wipers 12 when the vehicle is at a stop. The wiper motor 20 is also located in a bottom reversing position 38 in this [drawing]. This bottom reversing position 38 can also be used at low velocities, of course.

The reversing position 38 is thereby meant to be understood as the angle of rotation α of the wiper motor 20 relative to a fixed—although random—reference line 37, at which the direction of motion of the wiper motor 20 is reversed during operation. Due to the elasticities of the cranks 34, their angle of rotation is not necessarily identical to the angle of rotation of the reversing position.

The broken lines represent the wiper linkage during driving at high speeds. The reversing position 38 of the wiper motor 20 for the bottom end position of the wipers 12 is shifted slightly here—in the direction, in fact, where the wiper 12 would reverse at a lower position. Due to the air stream, however, the wiper 12 will never be located in this indicated position, but rather is always pushed into the same bottom end position, which, as a rule, is situated higher up during driving.

The wiper linkage is shown in FIG. 2b as in FIG. 2a, and the wiper 12 is now located in the top end position 14.

Analogous to FIG. 2a, the solid lines show the wiper linkage in the top end position 14 of the wipers 12 when the vehicle is at a stop. In this case, the wiper motor 20 is located in the top reversing position 40.

The broken lines show the wiper linkage during driving at high speeds. The reversing position 40 of the wiper motor 20 for the top end position 14 of the wipers 12 is shifted slightly inward here. The wiper 12 is always pushed into the top end position 14 by the air stream, however.

Figure 2C:
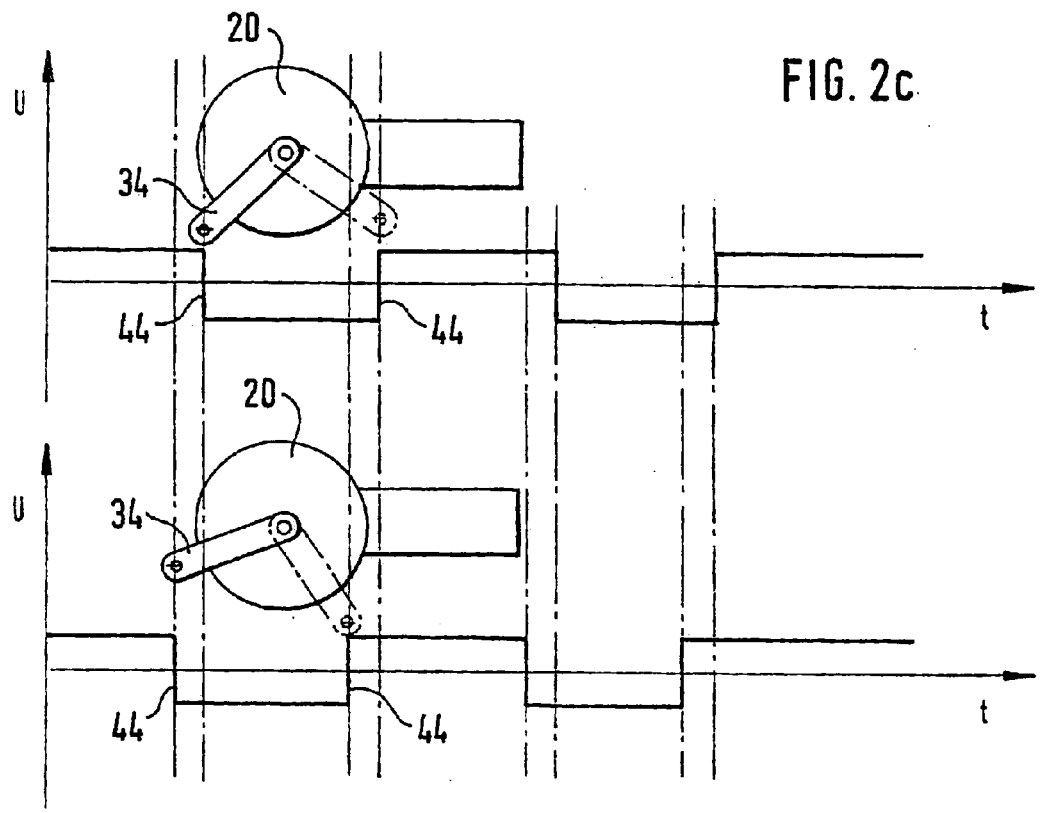
FIG. 2c is a diagram in which the motor voltage is plotted as a function of time t.

Two diagrams are shown in FIG. 2c, in which the electrical voltage at the wiper motor 20 is plotted as a function of time. The top diagram represents a vehicle at a stop. The bottom diagram represents a vehicle travelling at a high rate of speed.

The characteristic curve of voltage basically corresponds to a rectangle function with edges 44, although this curve can also have an entirely different character. A reversal of the polarity of the wiper motor 20 takes place at the edges 44 of the voltage curve in each case. Each edge 44 therefore corresponds to the top or bottom reversing position 38, 40 in each case. For purposes of clarification, the wiper motor 20 with the crank 34 was also drawn above each characteristic curve of voltage.

The comparison of the two diagrams shows that the wiper motor 20 reverses at earlier points in time when the vehicle is travelling at a high rate of speed, but these points in time can be set at random as necessary.

The crank 34 is thereby reversed in other positions, which has an effect on the wipers 12 via the remaining linkage. The displacements of the reversing positions 38, 40 of the wiper motor 20 are designed just great that reversal nevertheless takes place by the wipers 12 in the same end positions.

Figure 3:
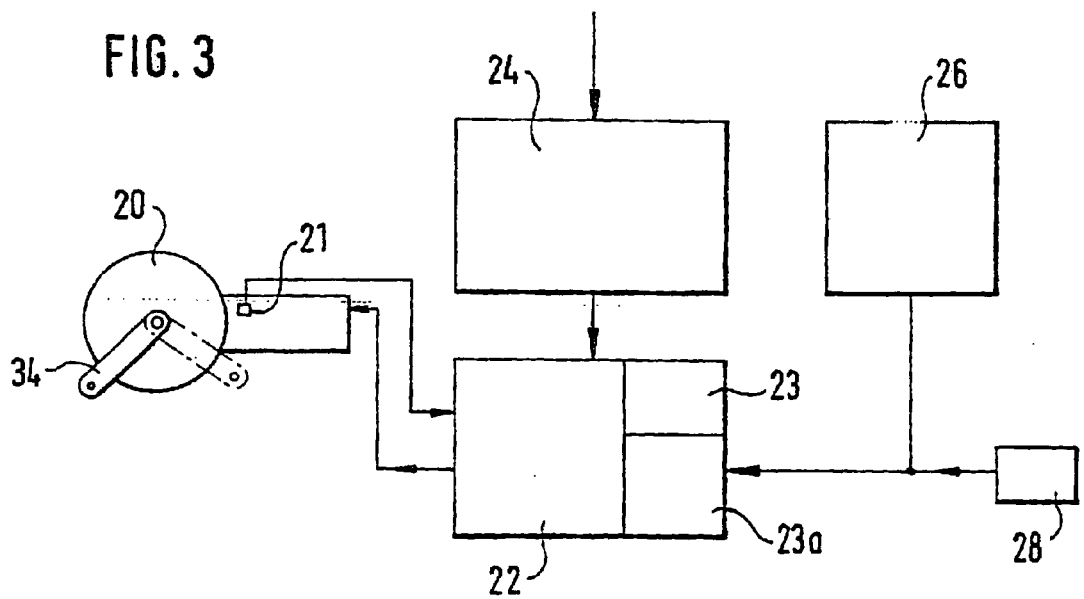
FIG. 3 is a schematic representation of a wiper system according to the invention.

A schematic representation of a wiper system according to the invention is shown in FIG. 3. The wiper motor 20, which is typically designed as an electronically reversible electric motor, is controlled by control electronics 22.

The wiper motor 20 is thereby provided with a position sensor 21 that is designed as a Hall effect sensor, for example, and the signals of which are sent to the control electronics 22. The wiper motor 20 can be controlled by the position sensor 21 and the control electronics 22 so that random positions of the wipers 12 can be moved into at any time. In this fashion it is possible to allow the wipers 12 to reverse at any point on the windshield 20 by changing the polarity of the input voltage of the wiper motor 20, that is, to select the reversing positions 38, 40 of the wiper motor 20 at random.

The control device 22 receives signals of the vehicle speed 24, which can be derived from the tachometer available in every motor vehicle, for instance. Furthermore, the control device 22 receives signals from the control lever 26, which is preferably designed as a switch on a steering column. Further signals, such as signals from a rain sensor 28, can also be fed to the control device 22, of course, and incorporated in the processing. The control device 22 comprises a memory device 23 and a central processor 23a for this purpose.

The function of the wiper system according to the invention is explained hereinafter.

When a vehicle is at a stop, that is, when the vehicle speed is zero, the wipers 12 reverse between the top and the bottom end position. A certain reversing positions of the wiper motor 20 correspond to these end positions when the vehicle is at a stop. Since, as illustrated in FIG. 1a, the end positions of the wipers 12 would shift upward with increasing vehicle speed due to the elasticities in the wiper system, the reversal positions of the wiper motor 20 are shifted according to the invention so that the end positions of the wipers 12 remain constant at all vehicle speeds.

Since the wiper 12 is pushed further and further upward with increasing vehicle speed, the wiper motor 20 moves the wiper 12 further downward, just so far that the end position of the wiper 12 at which it reverses remains constant. For this, the crank 34 is displaced by the wiper motor 20 further than would be necessary if the vehicle were at a stop. That is, with increasing speed of the vehicle, the bottom reversing position 38 of the wiper motor 20 is pushed further downward and, in fact, just so that a displacement of the end position of the wiper 12 is prevented.

Conversely, the wipers 12 are pushed further outward in the top end position with increasing vehicle speed. To compensate for this, the top reversing position 40 is shifted inward. This means that the crank 34 is displaced by the wiper motor 20 less far than it would be if the vehicle were at a stop.

The elasticities of the wiper system are equalized in this fashion, as a result of which the wiper 12 itself always reverses in the same end positions on the windshield at all speeds.

In FIG. 2a, the wiper linkage 32, 34, 36 is shown in the bottom reversing position 38 at a lower vehicle speed using solid lines, and the wiper linkage 32, 34, 36 is illustrated at a high vehicle speed using broken lines. At a higher vehicle speed, therefore, the bottom reversing position 38 is displaced by the angle δ.

In FIG. 2b, the top reversing position 40 is shown at a high vehicle speed using broken lines, and at a low vehicle speed using solid lines of the wiper linkage 32, 34, 36. Analogous to FIG. 1a, the top reversing position 40 is displaced by the angle γ here at a high vehicle speed.

In a variant of the wiper system according to the invention, the difference between the bottom reversing position 38 in FIG. 2a and the top reversing position 40 in FIG. 2b can also remain constant. With increasing vehicle speed, the angles δ and γ then become identically greater, which means that the difference of the reversing positions 38, 40 remains constant, although they both shift evenly.

What is claimed is:

1. A wiper system, in particular for a motor vehicle, comprising at least one wiper (12) supported in a fashion that allows it to swing between two end positions, that can be driven by an electric motor (20), wherein the electric motor is designed as an electronically reversible electric motor (20), wherein the two end positions of the wiper (12), and, therefore, the swing angle (16) enclosed by these, is determined by reversing positions (38, 40) of the electric motor, and wherein at least one reversing position (38, 40) of the electric motor (20) can be adjusted as a function of vehicle speed, via control means wherein the electric motor (20) changes a direction of rotation at an upper reversing position (40) and at a lower reversing position (38), and wherein the lower reversing position (38) is shifted upwardly with high vehicle speeds, by said control means so that a lower end position of the wiper (12) remains constant.

2. The wiper system according to claim 1, wherein a memory device (23) is provided in which the reversing positions (38, 40) of the electric motor (20) are stored as a function of the speed of the motor vehicle.

3. The wiper system according to claim 1, wherein the control means comprises a central processor (23a) that determines the reversing positions (38, 40) with consideration for the vehicle speed.

4. The wiper system according to claim 1, wherein an emergency operation step that is triggered when vehicle speed information is missing in which the reversing positions (38, 40) are permanently set.

5. The wiper system according to claim 1, wherein a differential angle enclosed by the reversing positions (38, 40) is constant, independent of the vehicle speed.

6. The wiper system according to claim 1, wherein, when a differential angle is constant, the reversing positions (38, 40) can be shifted as a function of vehicle speed.

7. The wiper system according to claim 1, wherein the wiper system comprises a rain sensor (28).

8. The wiper system according to claim 1, wherein the reversing positions can be adjusted by an angle of 0–20°.

9. The wiper system according to claim 1, wherein the reversing positions can be adjusted by an angle of 5–12.

* * * * *